May 19, 1964
B. FISHER ETAL
3,134,036
ELECTRIC MOTOR POWER POSITIONER AND SERVOSYSTEM
Filed Oct. 23, 1957
3 Sheets-Sheet 1
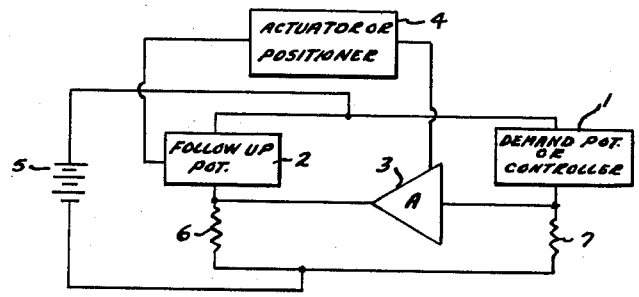
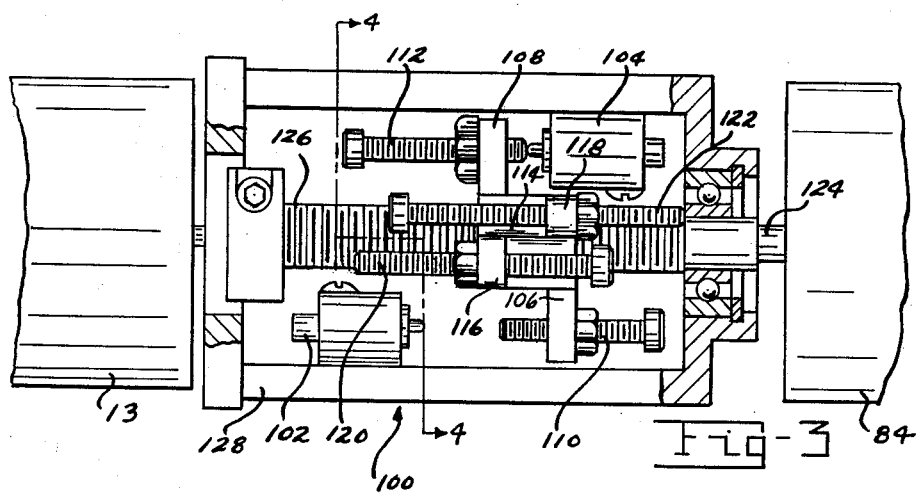
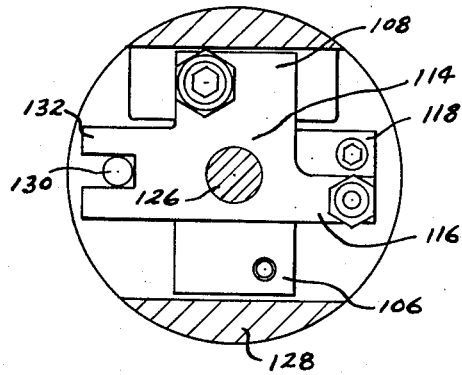
Bernard Fisher
Bernard Beaman
INVENTORS
BY Milton E. Gilbert
Attorney May 19, 1964     B. FISHER ETAL     3,134,036
ELECTRIC MOTOR POWER POSITIONER AND SERVOSYSTEM
Filed Oct. 23, 1957     3 Sheets-Sheet 2

Bernard Fisher
Bernard Beaman
INVENTORS

BY Milton E. Gilbert
Attorney

United States Patent Office 3,134,036
Patented May 19, 1964

3,134,036
ELECTRIC MOTOR POWER POSITIONER AND SERVOSYSTEM
Bernard Fisher and Bernard Beaman, Dayton, Ohio, assignors to United Systems Corporation, a corporation of Ohio
Filed Oct. 23, 1957, Ser. No. 691,895
7 Claims. (Cl. 310—68)

The present invention pertains to power positioners and more particularly to a novel electrical means for automatically rendering rapid and accurate positioning of a rotatable member in correspondence to the angular positioning of another rotatable member.

Remote positioning systems are desirable for many industrial control applications, such as controlling valves, machine control, feed screws, antennas, klystron tuning, remote positioning of television cameras or other devices located in hazardous or inaccessible areas, and various other uses requiring mechanical positioning where remote mechanical motion, either rotary or linear is required.

It is therefore one object of the invention to provide a simple and compact remote positioning system. It is a further object of the invention to provide a remote positioning system having oscillation-free high speed operation with minimum dead band. A still further object of the invention is to provide a remote positioning system having relatively constant torque capacity even at the smallest error signals and which provides for torque amplification. A further object of the invention is to provide a novel system of rate feedback in a remote positioning device. Still another object of the invention is to provide a remote positioning system in which a novel electrical and mechanical limit stop assembly is employed for preventing binding or sticking at the operating limits and the destruction of several of the elements of the system which are mechanically driven by a motor.

Figure 2:
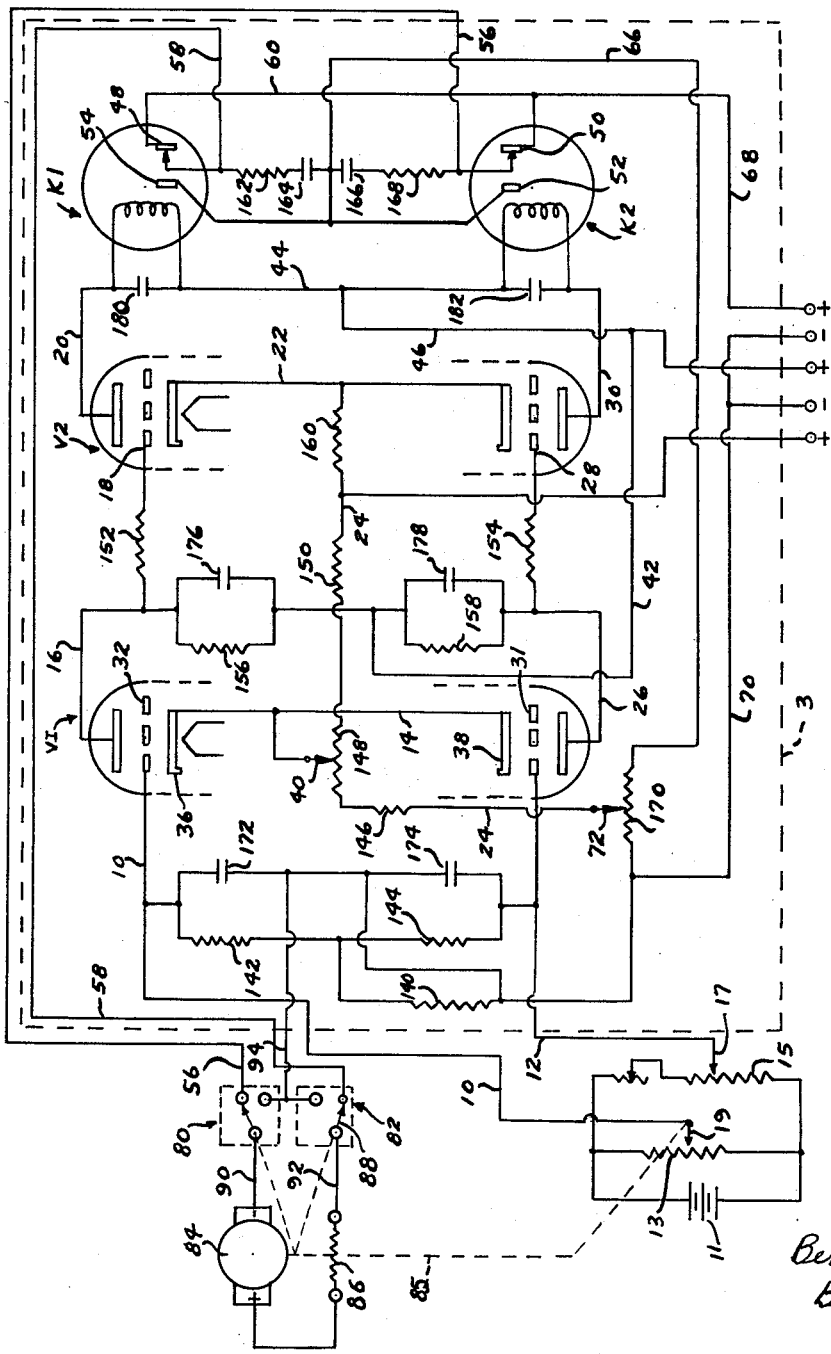
Figure 5:
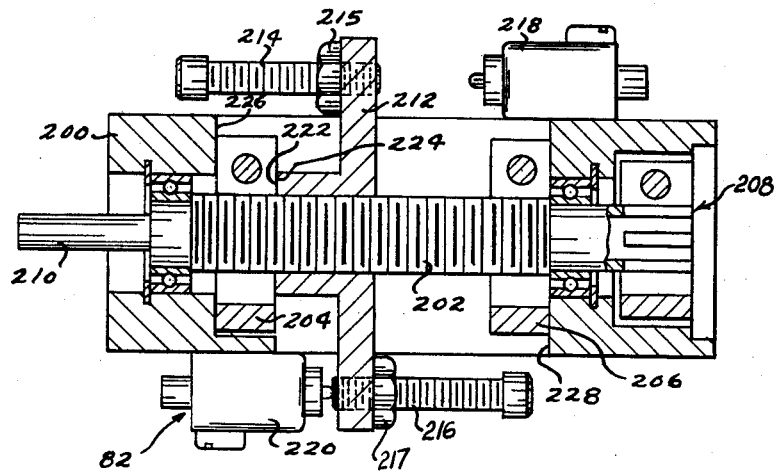
Figure 6:
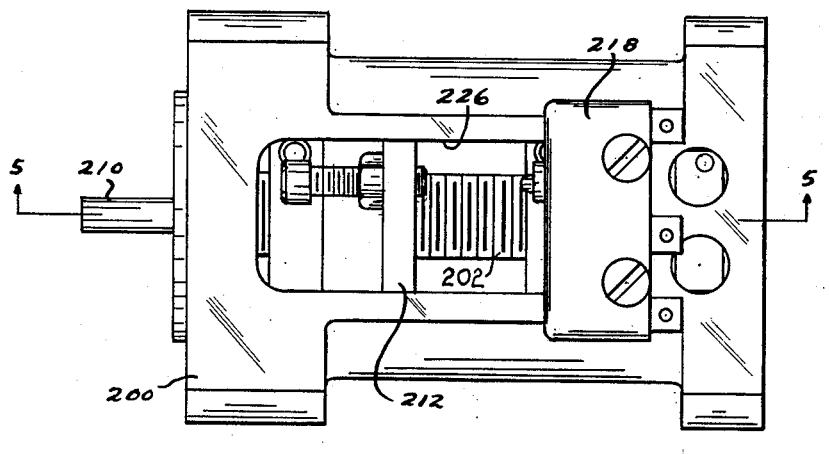

Other and further objects and advantages of the invention will become more readily apparent upon a reading of the description following hereinafter and upon an examination of the drawings illustrating preferred embodiments of the invention, in which:

FIGURE 1 is a schematic representation of the basic remote positioning circuit,

FIGURE 2 is a typical circuit diagram of the preferred embodiment of the invention, FIGURE 3 is a cross-sectional view of a mechanical and electrical limit stop assembly to be used in the invention, FIGURE 4 is a cross-sectional view taken along line 4—4 of FIGURE 3, FIGURE 5 is a cross-sectional view of the preferred form of limit stop assembly, and FIGURE 6 is a top view of the limit stop assembly of FIGURE 5.

The basic circuit of the remote positioning system consists of three elements, i.e., a controller, an actuator and an amplifier. The basic function of the amplifier being to interpret a small error voltage signal which is received from a bridge circuit and to interpret that small signal into a usable, reversible polarity D.C. signal, to be impressed upon the motor in the actuator unit. The controller may be manually operated, or substituted by a sensing element such as a pressure transducer which may be located at a position remote from the amplifier. The controller may contain the components needed to perform the positioning function of the system, such as potentiometers, push button switches, etc. to provide pre-set actuator positions. These pre-set positions may have vernier adjustment by means of individual trimmer potentiometers for a series of stations. Also, more than one controller may be used at different locations from each amplifier.

As indicated in FIGURE 1, a preferred circuit consists of an electronic amplifier in the diagonal or across a bridge circuit formed by the settable demand element or controller, and a follow-up element driven by the actuator. As the demand element position is changed, the error signal through the amplifier causes the actuator to move correspondingly until the follow-up element is driven to the new demand position, at which point zero error signal through the amplifier is restored. Referring again to FIGURE 1 it is seen that the demand pot or controller 1 and the follow-up pot 2 form two elements of a bridge circuit including fixed resistance elements 6 and 7. The amplifier 3 is placed across the bridge, and the output from the amplifier is fed to the actuator or positioner 4 which drives the follow-up potentiometer 2 to a new position in which the bridge is again placed in balance, resulting in zero error signal through the amplifier, as indicated above. The reference voltage source is indicated at 5. In the operation of such a circuit, the demand element or controller 1 would be moved from a position of bridge balance, resulting in an error signal being developed and applied or sensed by the amplifier 3, which is then amplified and used to power relays, which determine the direction of rotation of the actuator required to restore bridge balance.

A circuit diagram of the device showing the amplifier unit in greater detail is shown in FIGURE 2. The error sensing circuit consists of a source of power 11, and two potentiometers 13 and 15 connected in parallel to the source of power. The potentiometer 13 is the sensing or servo potentiometer which is driven by the actuator motor through a mechanical driving connection 85. The potentiometer 15 is the demand potentiometer which is positioned either manually or by some other means. The center tap 17 of the potentiometer 15 when moved from its initial position will cause a signal to be fed into the amplifier. After the signal is amplified and transmitted to the actuator motor 84, this motor is driven the desired amount, which in turn re-positions the tap 19 of the potentiometer 13 so that the two potentiometers are balanced and zero error signal is restored to the amplifier. The polarity of the signal in lines 10 and 12 is determined by the direction in which the center tap 17 is moved in relation to the position of the tap 19.

The output from the amplifier is tranmsitted by lines 56 and 58 through limit switches 80 and 82 to the actuator motor 84. A current limiting resistor 86 is interposed in the line 58 to prevent demagnetization and to limit the current to the motor 84 at the time when the motor may be reversing its direction. As is well understood, at such time the motor may generate an additional e.m.f. which would be added to the impressed e.m.f. and result in the burning out of the armature windings, should such a resistor be omitted. At the time the armature is shorted, the resistor 86 acts to increase the armature resistance to limit the current surge. The actuator motor 84 is also mechanically coupled by the coupling 85 as indicated above. Assuming the polarity in lines 56 and 58 is such that line 56 is negative and 58 is positive, then the rotation of the motor shaft will be sufficient to actuate the contact 88 of the limit switch 82, lines 90 and 92 will short circuit the armature, since the contact 88 will connect line 92 with the line 94 which is connected to the negative of the D.C. voltage soure.

Assuming that an error signal is generated by the sensing circuit in lines 10 and 12, this error signal from the control circuit is brought into the amplifier and fed into the duo-triode V1. The resistors 140, 142 and 144 create an electrical center tap of this error voltage signal. The two sections of the tube V1 then receive opposite but equal levels of the error signal. The cathodes 36 and 38 of the tube V1 are made common by lead 14 and are connected to a voltage divider consisting of resistors 146, 148 and 150. The function of this voltage divider is to provide a variable voltage to the cathodes of tube V1, thereby effecting its cathode to grid bias. By moving the adjusting arm 40 along resistor 148, an increase in bias of V1 is obtained, thereby reducing its sensitivity. As the sensitivity of V1 increases, the dead band of the servo system decreases. In operation, the sensitivity adjustment 40 is positioned to a point where optimum dead band without instability occurs. Once adjusted, the arm 40 remains in position. The error signal which is amplified by the tube V1 is then fed via lines 16 and 26 into the second stage of amplification. Resistors 152 and 154 serve to limit the current of grids 18 and 28. These resistors 152 and 154 prevent their grids 18 and 28, respectively, from exceeding a safe voltage value. Resistors 156 and 158 serve as plate load resistors for each section of V1 and are returned to a positive voltage source through line 42. Resistor 160 serves to limit the plate current of tube V2 to a safe value under any conditions. As stated above, the amplified error signal from the first stage of amplification is fed to the grids of tube V2, and is again amplified by tube V2 and fed into the pair of relays K1 and K2 through lines 20 and 30. Positive voltage for the plate of tube V2 is provided through line 44 via the relays K1 and K2.

Assuming that zero error voltage signal is applied to lines 10 and 12, then both sections of tube V2 will be normally conducting, therefore holding relays K1 and K2 in their closed position. When an error signal is present in lines 10 and 12, then one of the relays K1 or K2 will open, thereby driving the actuator motor in the direction indicated by the polarity of the error signal applied. When the error signal applied to lines 10 and 12 is removed by the action of the follow-up potentiometer described hereinafter, the relay opened by the presence of this error signal is again closed. Contact point 48 of relay K1 and contact point 50 of relay K2 are made common through line 60. When both relays are restored to their closed position the permanent magnet D.C. motor is therefore dynamically braked by shorting the motor. Lines 56 and 58 conduct the output signal from the relays K1 or K2 to the actuator motor. The network consisting of resistor 162 and condenser 164; and the network consisting of condenser 166 and resistor 168 serve as a spark suppression means on the contacts of relays K1 and K2. As indicated in the drawing, line 68 is the positive motor voltage source and line 70 is the negative motor voltage source. The negative voltage is applied through resistor 170 and line 66.

When the actuator motor 84 is running in either direction a voltage will appear at the adjustment arm 72 of the resistor 170. This voltage will be positive regardless of the direction of motor rotation in view of the fact that line 70 is grounded. When the value of voltage appearing in arm 72 exceeds that of the error voltage appearing across lines 10 and 12, the appropriate relay K1 or K2 will then close, tending to stop the actuator motor 84 and remove the voltage appearing at point 72. However, since there will still be some error signal continued to be fed into lines 10 and 12, the relay which has closed will again open, thus providing motor voltage and also voltage at point 72. This represents a cycling or feed-back circuit, which will continue to feed back as long as there is an error voltage present across lines 10 and 12. During this period of cycling, the motor will receive a series of pulses of equal amplitude, but decreasing in width. The motor therefore receives an average current during this re-cycling which varies from full applied current to zero current at zero error voltage. The purpose of this feed-back or re-cycling system is to enable the actuator motor 84 to anticipate the null point or balance point of the sensing or bridge circuit. Each time the feedback circuit cycles, the motor will receive a slightly reduced current, thereby momentarily reducing its speed and preventing any overshooting or instability of the system. This ability of the feedback circuit to stop the load on the actuator suddenly enough to prevent overshooting the balance point enables the prevention of the well known "hunting" about the null zone. The capacitors 172, 174, 176, 178, 180 and 182 serve to attenuate any A.C. component of the error signal, or any transients that may have been picked up in transmitting the error signal.

The preferred form of limit switch is shown in FIGURES 5 and 6. The limit switch 82 comprises a housing 200 having a threaded shaft 202 mounted therein. On this threaded shaft are mounted a pair of clamp or stop nuts 204 and 206. These nuts 204 and 206 are clamped into an adjusted position for a purpose as indicated hereinafter. One end of the shaft 202 is provided with a clamp type coupling connection 208 which enables the coupling of the limit switch mechanically via the connection 85 to the potentiometer 13. The other end 210 of the shaft 202 is provided with an output stub shaft or connection with the motor 84. A traveling nut 212 is threadedly mounted on the shaft 202. This traveling nut 212 carries one threaded adjustable arm 214 at one end and a similar arm 216 at the other end. These arms are locked into position by nuts 215 and 217, respectively. These arms are so positioned in the traveling nut 212 that they will serve as the actuator for limit switches 218 and 220, respectively.

As shown in FIGURE 5, the end of the adjustment arm 214 projects partly beyond the traveling nut 212, and this projection will contact the actuator button of the switch 218 when the traveling nut 212 has reached its limit of travel to the right as seen in FIGURE 5. In conjunction with this electrical limit switch arrangement, there is provided a mechanical stop arrangement which insures the operation of the unit and prevents destruction of the unit in event either or both of the electrical switches 218 or 220 fail. This mechanical stop is provided by the bifurcated nuts 206 and 204 which are locked into position on shaft 202 by a screw which draws the furcations together, serving as stops for the traveling nut 212, by mechanical contact of the two surfaces. As shown in FIGURE 5 the limit switch 220 is actuated, and almost simultaneously, but actually momentarily thereafter, the surface 222 of the traveling nut 212 contacts the surface 224 of the stop nut 204, thus positively stalling the motor and preventing destruction of the components. It is to be understood that the motor cannot be operated for any appreciable length of time in stalled condition, and therefore current limiting devices and/or circuit breakers are employed.

As seen in FIGURE 6 the traveling nut 212 is constrained to linear travel upon rotation of the threaded shaft 202, by the upper portion of the nut 212 sliding within an elongated slot 226 in the housing 200 and the lower end sliding within a similar slot 228 at the lower portion of the housing as viewed in FIGURE 5.

Another form of limit switch which may be employed is shown in FIGURES 3 and 4. This limit switch assembly 100 comprises a pair of micro switches 102 and 104. These switches are actuated by screws in the actuator arms 106 and 108. These actuator arms carry adjustable contact screws 110 and 112, which are the elements which actually contact the contact button of the micro switches. These elements comprise the electrical limit switch arrangement. The mechanical limit arrangement is provided by a similar pair of arms 116 and 118. The configuration of the traveling nut 114 is clearly shown in FIGURE 4, wherein the arms 106, 108, 116 and 118 appear in detail. The other end of the traveling nut 114 is provided with the bifurcated arms 132 which surround and slidably accommodate a rail 130 which is fixedly mounted in the switch housing 128. The mechanical stop pins 120 and 122 are adjustable in the same manner as the pins 110 and 112, and are similarly locked into position by a nut. These stop pins contact a portion of the housing 128 (not shown) when in their extreme position.

The rotor shaft 124 is threaded at a portion 126 to accommodate the traveling nut 114, which has a similarly threaded opening. The nut 114 is mounted on the shaft portion 126 and travels longitudinally of the switch housing 128. Thus, the nut 114 will travel from one end of housing 128 towards the other end in a manner similar to the traveling nut 212 in the preferred modification. When the traveling nut 114 is positioned by rotation of the motor shaft so that the screw 112 contacts the contact button of switch 104, an electrical stop will be accomplished. In the event the contact button of the switch 104 has become inoperative, then upon slight further travel of the nut 114, the stop pin 122 will contact one end of the housing 128 and positively prevent further rotation of the rotor shaft 124, thus stalling the motor 84. When the motor becomes stalled it immediately draws excessive current and will trip a line circuit breaker appropriately located at the power supply or on the supply cord. As just indicated, the stop pins 120 and 122 are so adjusted that they will not contact the housing until shortly after the electrical stops have been actuated.

The output of the actuator motor 84 can be used to control a valve, or a rheostat of a furnace, or other apparatus where a remote control instrumentation is desired. As indicated above, the apparatus described provides a high torque or torque amplification which can be delivered in small increments as desired.

Although preferred modifications of the invention have been described above it is readily understood that further modifications and changes may be made in the apparatus while still remaining within the scope and extent of the invention as defined in the appended claims.

What we claim is:

1. A system for rapidly and accurately positioning a controlled unit by a control unit, including in combination: a control unit means, a controlled unit means, signal generating means operatively connected with said control and controlled unit means arranged to generate an error signal variable in polarity and magnitude corresponding to the relative positioning of the two units with respect to one another, D.C. amplifying means connected in circuit with said signal generating means, a permanent magnet D.C. reversible motor operatively connected to receive signals from the amplifying means and further connected with the controlled unit means for moving the latter in response to the amplified error signals, said amplifying means being so constructed and arranged as to separate said incoming error signal into two component signals of the same level but opposite polarity, a pair of relays each connected to receive one of the component error signals from said amplifying means and further connected to transmit said signals to actuate said D.C. motor in accordance with the polarity of said signals to thereby determine the direction of rotation of said motor, degenerative feedback means arranged to continuously impress a signal of positive polarity and predetermined magnitude upon said amplifying means when the motor is running, said arrangement being such that when the error signal level exceeds the feedback impressed signal level one of said relays will be caused to momentarily discontinue transmitting signals to said motor and to immediately thereafter commence signal transmission to said motor, whereby said motor receives a series of actuating signals of equal amplitude but successively less duration, said arrangement further being such that upon removal of said error signal said relays operate to short said motor and thus dynamically brake same, whereby said motor receives an average actuating current of decreasing magnitude as said controlled unit approaches its desired position.

2. The system of claim 1 wherein said feedback means includes a variable resistor element in series with a similarly arranged contact of each of said relays to permit drive means current to flow therethrough when said relays actuate said drive means, the setting of said resistor determining the magnitude of feedback signal which must be reached before it is transmitted to the amplifier means.

3. The system of claim 1 wherein the drive means is mechanically interconnected with a rebalancing element forming a portion of the error signal means, and a limit switch means interposed in said mechanical interconnection comprising both electrical and mechanical stops to deactivate the drive means and positively prevent actuation of the rebalancing element beyond a predetermined position.

4. The system of claim 3 wherein said limit switch means comprises a housing, a drive shaft rotatably mounted within said housing, a traveling member mounted on said shaft and constrained to linear motion, said traveling member carrying adjustable contact means for engaging an electric switch controlling said drive means and a second contact means for engaging a portion of said housing to positively prevent further rotation of said drive shaft.

5. The system of claim 4 wherein said second contact means is adjustable and said portion of said switch means is mounted on said drive shaft and is adapted to be locked to said shaft at any position therealong.

6. Limit switch means for a drive motor coupled to a drive element, wherein the extent to which the latter is driven is required to be controlled, comprising in combination:
a housing encompassing at least the limit switch means;
a drive shaft rotatably mounted within said housing, said drive shaft being connected to said drive motor and to said driven element;
a traveling member mounted on said drive shaft to be driven thereby;
means to constrain said traveling member to linear motion along said shaft;
said traveling member carrying an adjustable contact means for engaging an electrical switch arranged to control said drive motor, and
a mechanical stop means formed partially by a portion of said traveling member for engaging a surface immovably fixed relative to said housing, to positively prevent further rotation of said drive shaft.

7. The limit switch means of claim 6 wherein said mechanical stop means is partially adjustable and said fixed surface is formed on a member mounted on said drive shaft and adapted to be locked to said shaft at any position therealong.

References Cited in the file of this patent

UNITED STATES PATENTS

| | | |
|---|---|---|
| 1,551,512 | Goff | Aug. 25, 1925 |
| 2,209,369 | Wills | July 30, 1940 |
| 2,418,351 | Jackson | Apr. 1, 1947 |
| 2,446,393 | Russell | Aug. 3, 1948 |
| 2,499,166 | Russell | Feb. 28, 1950 |
| 2,692,358 | Wild | Oct. 19, 1954 |
| 2,780,760 | Dion | Feb. 5, 1957 |
| 2,948,839 | Smith et al. | Aug. 9, 1960 |

FOREIGN PATENTS

| | | |
|---|---|---|
| 655,636 | Great Britain | July 25, 1951 |